US008458727B2

United States Patent
Palmer et al.

(10) Patent No.: US 8,458,727 B2
(45) Date of Patent: Jun. 4, 2013

(54) ASYNCHRONOUS CLIENT TO SERVER UPDATES

(75) Inventors: Michael Palmer, Edmonds, WA (US);
Oscar Papel, Redmond, WA (US);
Weiye Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1218 days.

(21) Appl. No.: 11/982,800

(22) Filed: Nov. 5, 2007

(65) Prior Publication Data

US 2009/0119302 A1    May 7, 2009

(51) Int. Cl.
G06F 3/00 (2006.01)
G06F 9/44 (2006.01)
G06F 9/46 (2006.01)
G06F 13/00 (2006.01)

(52) U.S. Cl.
USPC .......................................................... 719/318

(58) Field of Classification Search
None
See application file for complete search history.

(56) References Cited

U.S. PATENT DOCUMENTS

| 6,029,175 | A | 2/2000 | Chow et al. |
| 6,219,676 | B1 | 4/2001 | Reiner |
| 6,934,766 | B1 * | 8/2005 | Russell ........................ 709/246 |
| 6,973,463 | B2 | 12/2005 | Merrells et al. |
| 6,976,038 | B2 | 12/2005 | Acree et al. |
| 7,158,985 | B1 | 1/2007 | Liskov |
| 2002/0016830 | A1 * | 2/2002 | Nicolai ........................ 709/219 |
| 2005/0010607 | A1 * | 1/2005 | Parker et al. .................. 707/200 |
| 2005/0021571 | A1 | 1/2005 | East |
| 2005/0198084 | A1 | 9/2005 | Kim |
| 2006/0074911 | A1 | 4/2006 | Veagovici-Negoescu et al. |
| 2006/0218147 | A1 | 9/2006 | Shrivastava et al. |
| 2006/0224597 | A1 | 10/2006 | Fitzpatrick et al. |

OTHER PUBLICATIONS

Nishimoto, "*The Log Manager (xLM)*" http://oss.sgi.com/projects/xfs/design_docs/xfsdocs93_ps/log_mgr.ps, Mar. 28, 1994, pp. 1-10.

* cited by examiner

*Primary Examiner* — Emerson Puente
*Assistant Examiner* — Kimbleann Verdi

(57) ABSTRACT

Methods and apparatus are provided which enable client-server communication during the execution of a web application to be batched, so as to manage the processing load on server-side components of the web application and the transmission load on the network(s) coupling the client and server. In some embodiments, client-side components of the web application are operable to capture processing events in a change log on the client, and transmit at least a subset of the entries in the change log to the server upon the occurrence of a predetermined event, such as a passage of time since a previous transmission.

20 Claims, 5 Drawing Sheets

ASYNCHRONOUS CLIENT TO SERVER UPDATES

FIELD OF THE INVENTION

This invention relates to network communications, and more particularly to communications between client and server nodes in a networked environment.

BACKGROUND OF THE INVENTION

Traditionally, most applications accessed via the World Wide Web (hereinafter referred to as "web applications") were implemented using a client-server model in which most application processing was performed on the server. That is, in this model, a "thin client" was used mainly to display static content (e.g., hypertext markup language, or HTML) generated by processing occurring on the server. One drawback to this approach is that any user interaction with the application (e.g., via a browser executing on the client) requires processing by the server. Specifically, any user input to a web page rendered by the browser on the client is communicated to the server, the server processes the input, and the server responds by sending processing output to the client, which the client then loads in the form of a refreshed web page. This communication loop is generally referred to as synchronous communication between the client and server.

More recently, web applications have evolved somewhat in that more processing is performed on the client, to circumvent this synchronous communication loop. For example, some web applications include code which executes on the client and "sits between" the browser and server. This code is generally downloaded from the server when the application is initiated on the client, and may be supplemented by further downloads as the application executes. Usually, the code acts as an extension of the browser, and may be responsible for performing such functions as rendering the web application's user interface via the browser and managing communication between the user interface and server. Typically, the code operates to provide a richer user experience as compared with traditional web applications, by enhancing some aspect of the user interface and/or improving the application's responsiveness when handling certain user interactions.

The code may facilitate asynchronous communication between client and server instead of, or in addition to, the synchronous communications described above. For example, the code may initiate communication with the server despite having received no user input, such as a click on a button or link. As a result, application processing may be performed and new information may be presented via the user interface without forcing the user to wait for a page refresh. As such, the web application's responsiveness may approximate that of an application executing solely on the client. One well-known technology for implementing web applications which employ asynchronous client-server communication is asynchronous java script and XML (AJAX).

BRIEF SUMMARY OF THE INVENTION

Applicant has appreciated that while asynchronous communication between client and server can improve the responsiveness of web applications, it may be desirable to control the rate at which such communication occurs so as to ensure that the load on the server (e.g., web application components executing thereon) is kept at a manageable level, and that network bandwidth is used efficiently. Accordingly, in some embodiments of the invention, communication between client and server is batched, so that data may be sent to one or more web application components executing on the server in an orderly and controlled manner, rather than simply being sent when code executing on the client generates output which would conventionally be communicated to the server. In addition, in some embodiments, communication between client and server may be throttled to suit operating or processing conditions, such as by decreasing the frequency of client-server communications when the processing load on web application components on the server is greater or increasing the frequency when the load is less great. Batching client-server communications may also decrease the amount of data communicated via the network, by spreading communication overhead (e.g., the headers, footers, etc. added to any communication traveling over the network) across multiple client-server communications, rather than being appended to each individual communication between client and server.

In some embodiments of the invention, a change log is used to capture processing events on the client which might conventionally cause communication with the server to be initiated, and these change log entries (or some derivation thereof) are transmitted to the server in batch. In some embodiments, the server (e.g., one or more web application components executing thereon, such as web services) may process the change log entries to "replay" the actions that occurred on the client. The results of this processing may then be sent back to the client. Depending on the implementation, web application components executing on the client may process the results to present one or more changes (e.g., resulting from the processing on the server) to the user via the user interface, to determine one or more operations performed on the server (e.g., to determine the success or failure of such operations), and/or to accomplish any other suitable processing objective, as the invention is not limited in this respect.

In some embodiments, web application components residing on the client and server each operate on data objects which closely correspond to each other, such that the client and server each maintain a version of data used by the web application. For example, in one exemplary implementation described below, the web application enables a user to create, modify and save documents (e.g., lists, notes, spreadsheets and/or other instruments). In some embodiments, when the web application is initiated, the server provides one or more objects to the client, each including data for one or more documents, and retains a corresponding set of objects. The one or more objects provided to the client are cached on the client, and employed by web application components executing on the client as the user interacts with the application. For example, when a user makes a change to a document (e.g., to update data reflected in the document), the change is propagated to one or more cached objects representing the document. In some embodiments, this change causes an event to be fired on the client that initiates the creation of a change log entry corresponding to the change.

In some embodiments, when a predetermined event occurs (e.g., a predetermined interval passes, a quantity of user actions is performed, a particular user action or sequence of actions is performed, one or more other events occur, or any combination thereof), the entries which have been recorded in the change log since a previous communication with the server are sent to the server, and one or more web application components executing on the server process each entry. In doing so, the server components may, for example, replay changes occurring on the client object(s) to one or more corresponding objects on the server, cause objects corresponding to objects newly created on the client to be created on the server, or perform any other suitable processing. For example, a web application component on the server may process a change log entry by identifying and retrieving one or more objects residing on the server which correspond to objects modified on the client, and repeat a change (and/or any other desired action) on the retrieved objects, so as to replicate the change or action that occurred on the client.

In some embodiments, when the server has completed processing all change log entries, the processing results are returned to the client, and code executing on the client processes the result for each change log entry. The client code may process the result(s) in any suitable fashion. For example, the code executing on the client may process the result(s) to present changes to the user (e.g., if the code is configured present any changes to the user only upon the server's completion of change log processing), or may process the result(s) to confirm the success of one or more operations (e.g., if the code is configured to present any changes to the user immediately, before server change log processing completes), or in any other fashion. As a result of the above-described coordination between client and server components, updates are performed on the client and server in a well-ordered, predictable manner, the state on the client is kept consistent with that on the server, changes occurring on the client are reproduced in a deterministic fashion on the server.

DETAILED DESCRIPTION

Figure 1:
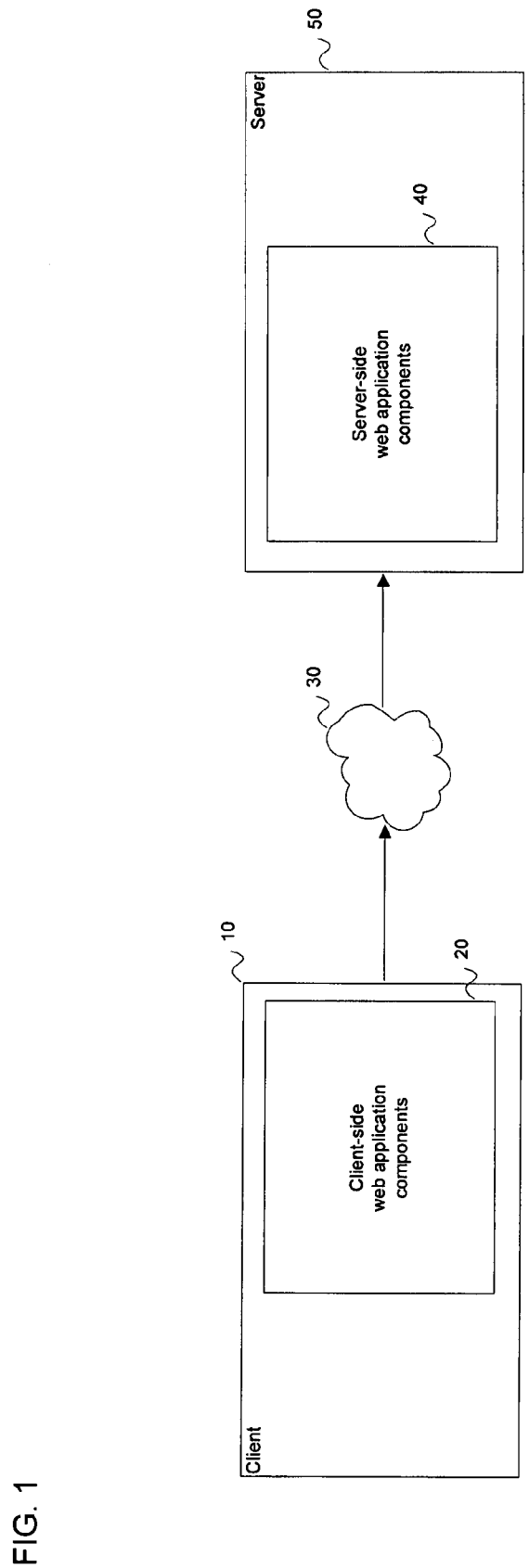
FIG. 1 is a block diagram depicting an exemplary client-server architecture in which aspects of the invention may be implemented.

In accordance with some embodiments of the invention, communication between client and server during the execution of a web application may be batched. For example, information which might conventionally have been sent from the client to the server via multiple communications, each reflecting a single processing event on the client, instead may be sent in a single communication reflecting multiple processing events on the client. Batching client-server communication may have numerous advantages over conventional modes of communication employed by web applications, including allowing the frequency of such client-server communications to be optimized to suit operating conditions and/or desired application responsiveness. For example, the frequency may be throttled to maintain a manageable processing load on web application components executing on the server, such as by decreasing the frequency of client-server communications when the load on server-based components is greater. Batching client-server communications may also allow network bandwidth to be conserved. For example, communication between client and server could be timed to occur during periods when network latency is low. In addition, batching client-server communication may decrease the amount of data communicated via the network overall, by spreading any communication overhead (e.g., headers, footers and other data typically appended or pre-pended to network messages) across multiple processing events, rather than attaching such overhead to multiple communications, each describing a single processing event. Of course, embodiments of the invention are not limited to increasing or decreasing the frequency of client-server communications to manage processing or transmission load on a system, as communication frequency may be adjusted to suit any suitable processing condition(s).

In accordance with some embodiments of the invention, a change log may be used to capture events occurring on the client, such as input provided by the user to a web application and/or processing events performed in conjunction therewith. One or more change log entries, and/or some derivation thereof, may be transmitted to the server in batch upon the occurrence of one or more predetermined events. For example, change log entries may be sent to the server upon the passage of a predetermined amount of time, the user having performed a predetermined number of actions, the user having performed a particular action (or sequence of actions), the change log containing a predetermined number of entries and/or amount of data, any other event(s) or occurrence(s), or a combination thereof. For example, change log entries may be transmitted to the server when either a certain amount of time passes since a previous communication, or the user performs a particular action. The event(s) that cause change log entries to be sent to the server may be defined in any suitable fashion, as the invention is not limited in this respect.

Some embodiments may provide for the frequency of client-server communication to be adjusted "on the fly," or throttled, so that if (for example) network traffic increases or a web application component on the server becomes overloaded, the frequency may be decreased. Conversely, the frequency may be increased if, as an example, processing or transmission capacity increases. The frequency of client-server communications may be adjusted to suit any suitable operating condition, processing need, or other requirement, as the invention is not limited to any particular implementation.

In some embodiments, each client-server communication contains one or more change log entries which each record a processing event that has occurred on the client. As discussed above, web application components on the server may replay those actions or events on one or more objects residing on the server which correspond to one or more objects residing on the client. For example, in one exemplary implementation wherein the web application enables a user to create, modify and save one or more types of documents (e.g., lists, notes, spreadsheets, other virtual representations of written instruments, and/or a combination thereof), each object corresponds to a document. When the web application is initialized, one or more objects, representing one or more documents, are sent from the server and cached on the client. The object(s) are employed by code executing on the client as the user interacts with the document via the user interface. When the user changes a document, the object corresponding to the document is also changed. In some embodiments, a change to an object causes an event to be fired, which in turn results in a change log entry being created to reflect the change. When the change log entries are sent to the server, one or more web application components on the server process each entry to replicate the actions described thereby on corresponding objects on the server. For example, a change log entry may be processed by identifying and retrieving the one or more objects on the server that correspond to the object(s)

changed on the client, and then replicating the change by repeating the action described by the change log entry. When the server finishes processing the change log entries, it may transmit results of this processing to the client, which may process the results to, for example, render the results via the user interface, to determine the success or failure of server processing and present results accordingly to the user, or to accomplish any other processing objective.

In some embodiments, the sequence of change log entries sent to the server reflects the order of actions which have occurred on the client, to prevent any data inconsistencies which could arise if actions are replayed in a different order than that in which they originally occurred. For example, in some embodiments, change log entries are recorded in the sequence in which they occurred on the client. In addition, in some embodiments, the client and server may each maintain versions of each object, and each change log entry may specify an operation performed on a particular object version, so that consistency between objects maintained on the client and server may be assured. Of course, the invention is not limited to being implemented in this manner. For example, change log entries may be captured and/or recorded in any suitable manner, and version numbers may not be employed for objects on the client, server, or either.

In some embodiments, change log entries may be merged, combined or otherwise collapsed, such as to reduce the amount of data communicated between client and server and the amount of processing required on the server to replay the actions described by the change log entries. For example, if a user provides a first input indicating that a change should be made, and then provides a second input indicating that the change should be reversed, because the change log entries describing these two inputs cancel each other out, the entries may be deleted from the log before it is sent to the server. Of course, embodiments of the invention are not limited to being implemented in this manner, as any suitable amount of change log entry optimization (including none at all) may be performed.

An exemplary computing environment in which aspects of the invention may be implemented is shown in FIG. 1. In particular, FIG. 1 depicts an environment in which a web application includes one or more client-side components 20 executing on client 10 and one or more server-side components 40 executing on server 50. Client-side components 20 and server-side components 40 may each be programmed using any suitable programming language and/or development technique, as the invention is not limited in this respect. For example, in some embodiments at least some of client-side components 20 may be implemented via asynchronous javascript and XML (AJAX), and/or any other suitable tool(s) and/or implement(s), and at least some of server-side components 40 may be web services implemented via C#, Java, and/or any other suitable tool(s) or implement(s). Client-side components 20 communicate with server-side components 40 via one or more networks 30, each of which may employ any suitable communications infrastructure and/or protocol(s), as the invention is not limited to any particular implementation.

Figure 2:
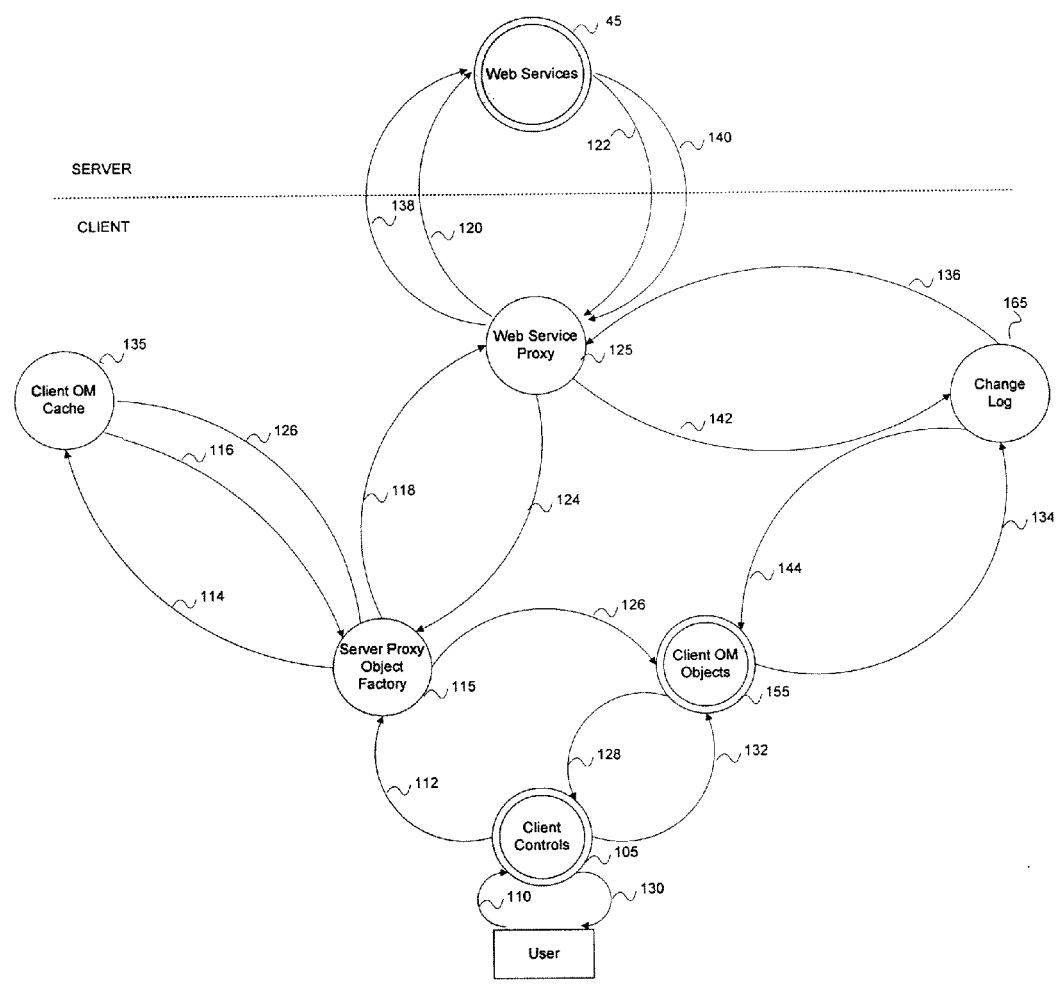
FIG. 2 is a data flow diagram depicting processing performed on the client, in accordance with some embodiments of the invention.
Figure 3:
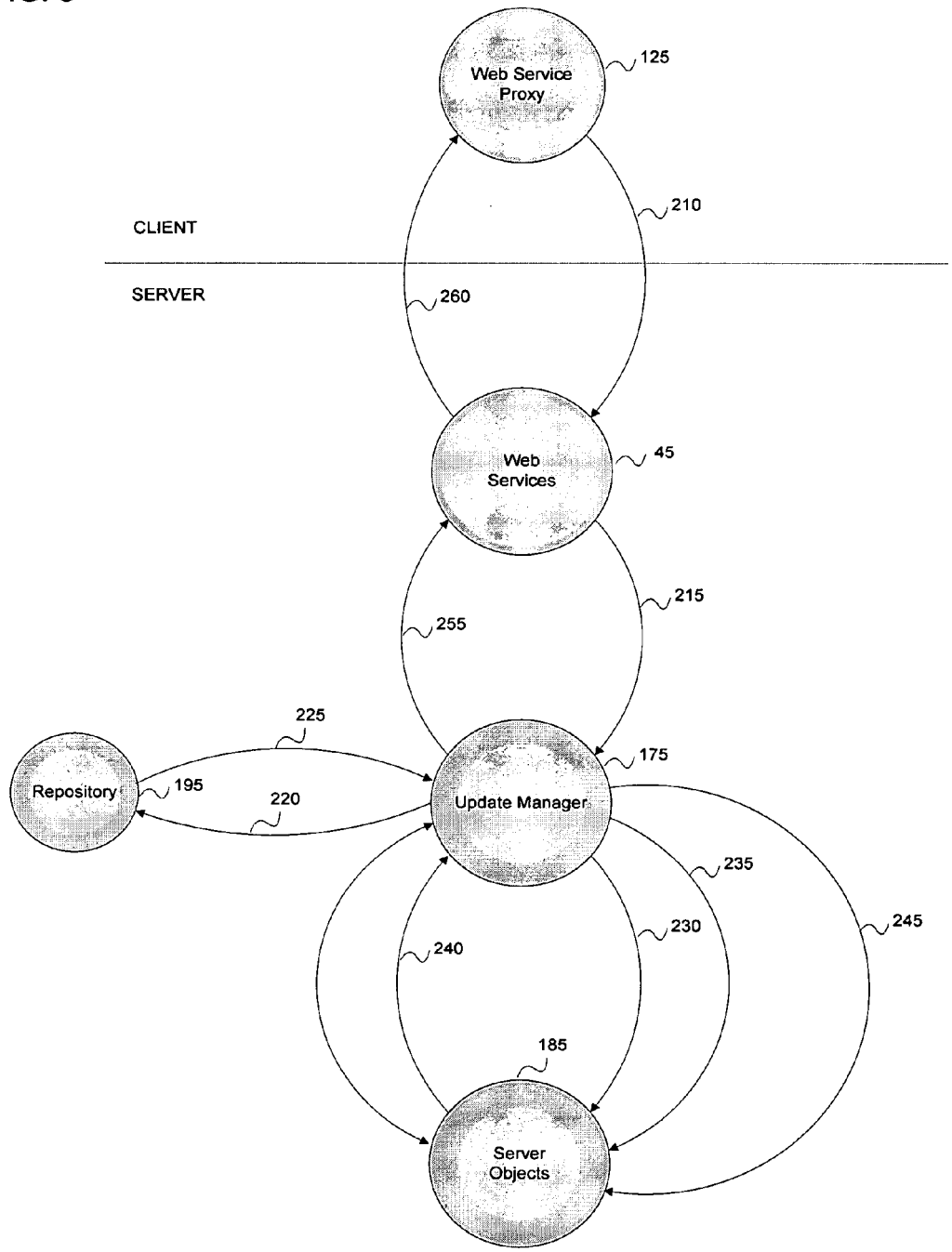
FIG. 3 is a data flow diagram depicting processing which occurs on the server, in accordance with some embodiments of the invention.

FIGS. 2 and 3 depict exemplary processing which may be performed on client 10 and server 50, respectively, to implement various aspects of the invention. Specifically, FIG. 2 depicts processing that may be performed by client-side components 20 to enable a user to navigate to, create, modify and/or save one or more types of documents (e.g., lists, notes, spreadsheets, other virtual representations of one or more instruments, etc.). One example of a web application offering this type of functionality is the Office Live Workspace product offered by Microsoft Corporation of Redmond, Wash., the assignee of the present application. FIG. 3 depicts processing which may be performed by server-side components 40 in response to communications sent from client 10 during the execution of client-side components 20, such as to process requests and/or change log entries sent to server 50 by client 10.

FIG. 2 depicts exemplary processing steps which may be performed on client 10 to allow a user to navigate to, and then edit, a particular document. Depicted in FIG. 2 are various components (i.e., client controls 105, server proxy object factory 115, client object cache 135, web service proxy 125, change log 165 and client objects 155) which form at least some of client-side components 20 (FIG. 1).

At the start of this processing shown in FIG. 2, in act 110, a user provides input to client controls 105 indicating a request to navigate to the document. In act 112, client controls 105 issues a request to server proxy object factory 115 for an object corresponding to the document. In act 114, server proxy object factory 115 issues a request for the object corresponding to the document to client object cache 135.

In some embodiments, only a single copy of each data element used by objects on the client is kept, so as to minimize the amount of data that the client is required to store overall, and to allow for any change to the data to be reflected by all affected objects. For example, if a particular data element stores the name of a document, and the value stored in the data element is changed, then all objects which employ the data element (e.g., a first object corresponding to the document itself and a second object representing a list of all documents) may automatically reflect the change. Of course, the invention is not limited to being implemented in this manner, as data may be stored in any suitable fashion.

In the example shown, the object corresponding to the requested document is not stored in client object cache 135. If the object had been stored in cache, in some embodiments, it may be returned to server proxy object factory 115 and provided to client controls 105, so that the user interface rendered by client controls 105 reflects the data stored in the object in the requested document.

In the example shown in FIG. 2, in act 116, server proxy object factory 115 is informed by client object cache 135 that the object is not stored in cache on the client. When this occurs, in act 118, server proxy object factory 115 issues a request to web service proxy 125 for the object, which in turn requests the object from server 50 in act 120. In some embodiments, web service proxy 125 handles all communication between client 10 and server 50. As described further below, funneling all communications through web service proxy 125 may enable the batching of communications between client and server.

Server 50 provides the object in act 122, which causes web service proxy 125 to inform server proxy object factory 115 that the requested object has been provided by the server in act 124. In act 126, server proxy object factory 115 processes the object received from server 50 to create a client object. For example, in some embodiments, server proxy object factory 115 augments the object received from the server by adding information (e.g., instructions, parameters, and/or other information) that specifies that if any data contained in the object is changed on the client, an entry should be made to change log 165. For example, the information added to the object may specify that if the object's underlying data is changed, an event should be fired on the client which causes change log 165 to add an entry reflecting the change. When the client object has been created, server proxy object factory 115 stores it in client object cache 135, and registers it with change log 165. In some embodiments, registering the object with change log 165 enables the change log to listen for actions involving the newly created object (e.g., changes to its underlying data, a request to save the object, etc.).

In act 128, the client object is provided to client controls 105 so that the requested document, including data stored in the client object, may be rendered on the page (e.g., via the user interface presented by code layer(s) 20) in act 130. In the example shown in FIG. 2, the user then employs the user interface to modify the document by changing one or more values reflected in the client object. For example, if the document is a spreadsheet (or, using the terminology employed by the Office Live product referenced above, a "list"), the user might change a value stored in a cell, and then "tab out of" the cell. In some embodiments, this action might cause an update to data stored in the client object created in act 126.

In some embodiments, the user's indication via the user interface that a change to the document should be made causes the client object to be updated. In some embodiments, this is accomplished by binding the object to portions of client-side components 20, such that any change indicated via the user interface causes the object to be updated. In act 134, the change to the object causes an event to be fired. Because the client object was registered with change log 165, the change log is listening for changes to the client object. As a result, the event causes change log 165 to record an entry specifying the identifier and type of client object (in this example, a spreadsheet ("list"), although any type of object may be specified), the action performed on the client object (in this example, an update to the client object), and one or more name/value pairs corresponding to the changes that were made (in this example, an identifier for the cell in which the changed data resides, and the new value).

As described above, entries to change log 165 may be communicated to server 50 in batch upon the occurrence of a predetermined event. As a result, acts 132 and 134 may be repeated any number of times, resulting in any number of changes to any number of client objects, and corresponding entries to change log 165, before the entries (or some derivation thereof) are communicated to server 50. As described above, the one or more events that may cause change log entries to be sent to the server may include the passage of a particular amount of time, the user having performed a particular number of actions, the user having performed a particular action or sequence of actions, the change log containing a particular number of entries and/or amount of data, any other event(s), or a combination thereof.

In the example shown, once the predetermined event(s) occur(s), the change log is provided to web service proxy 125 in act 136, and then sent to server 50 in act 138, such that server 50 is informed of changes to one or more objects residing on client 10.

Each change log entry may include any suitable information, as the invention is not limited in this respect. For example, in some embodiments, a change log entry may include information that enables the server to identify one or more object that have been changed on the client, as well as the nature of the change(s), so that the change(s) may be replicated on the server. For example, each change log entry may include a unique entry identifier, an indication of the type of action performed (e.g., to create, delete, modify, save, or otherwise act on a particular object), the identifier and type of the object(s), and one or more name/value pairs indicating the changes made to data stored in the object(s).

As described above, one or more web application components executing on server 50 may receive and process change log entries sent in act 138 to replicate the changes made to the client object(s) to data stored on the server (e.g., on a corresponding one or more objects stored on the server). This server-side processing is described in further detail below with reference to FIG. 3, following the description of the remainder of FIG. 2.

In act 140, the results of processing performed on server 50 are returned to web service proxy 125, and in act 142, web service proxy 125 provides the results to change log 165. In act 144, these results are provided to client objects 155, so that any changes to client objects necessitated by the processing performed on server 50 may be reflected in the appropriate client object(s). For example, in some embodiments, each object stored on the server includes a version number, and any change to an object causes its version number to be updated. Once updated, the client object(s) may be provided to client controls 105 so that any document(s) corresponding to the object(s) may be rendered via the user interface.

FIG. 3 depicts exemplary processing which may occur on the server to replicate actions reflected in one or more change log entries on the server. Depicted in FIG. 3 are various components (i.e., web services 45, update manager 175, server objects 185 and repository 195) which form at least some of server-side components 40 (FIG. 1).

In act 210, web services 45 receives entries in the change log, or some derivation thereof, from web service proxy 125. In some embodiments, the communication of entries in the change log occurs in the form of a web service call made by web service proxy 125. In act 215, web services 45 calls update manager 175 to process the change log entries sent by web services proxy 125.

In some embodiments, change log entries may be processed in the order in which they appear in the change log. Of course, the invention is not limited to such an implementation, as numerous ways of processing change log entries may be envisioned.

Acts 220-250 described below each refer to processing which may be performed for each individual entry found in the change log. Specifically, in these acts, update manager 175 processes a change log entry to identify the client object to which the entry refers and the version number of that object, and then replicates the processing event which occurred on the client object on a corresponding server object.

In act 220, update manager 175 performs a lookup on repository 195 to determine the server object which corresponds to the client object identified in the entry, and the version number for that object. As discussed above, each object stored on the client and server may include a version number which is updated each time the object is changed, to ensure that the data maintained on the client and server satisfactorily correspond. In act 225, an indication of the server object and version number is returned to update manager 175. In act 230, the version numbers of the client and server objects are compared. This may be done, for example, to ensure that the processing event which occurred on the client did not process data that is corrupt, stale, or otherwise does not correspond to the object version stored on the server.

In the example of FIG. 3, if the version numbers match, in act 235, update manager 175 issues a call for the object from server objects 185, and in act 240 the object is made available. In act 245 update manager performs the operation(s) specified in the change log entry on the object. For example, update manager 175 may change data stored in the object stored on the server that corresponds to the client object identified on the change log entry, or perform some other operation.

If the version numbers do not match, then in act 250 update manager 175 determines the current state of the object stored on the server. In some embodiments, this is done so that the state may be provided to web application components on client 10, so that the client object to which the change log entry refers may be updated on the client. Update manager 175 may also provide information to client 10 (e.g., an error code, indication of the most current version of the object on the server, and/or other information) which may, for example, cause the component(s) on client 10 to present a message to the user, such as to inform the user that the client and server versions of the object do not match.

In some embodiments, the processing described above relating to version numbers for an object is performed only for certain types of actions reflected in the change log. For example, it may not be performed for change log entries which indicate that a new object was created on the client, since no version number for the new object will yet exist on the server. As a result, in some embodiments, the above-described processing relating to version numbers is performed only for updates to and deletion of objects.

In act 255, update manager 175 collects the results of processing all change log entries, and sends the results to web application components 40. In act 260, these results are sent to web service proxy 125, and processing continues as described above with reference to acts 142-144 in FIG. 2.

Various aspects of the systems and methods for practicing features of the invention may be implemented on one or more computer systems, such as the exemplary computer system 400 shown in 5. Computer system 400 includes input devices 402, output devices 401, processor 403, memory system 404 and storage 406, all of which are coupled, directly or indirectly, via interconnection mechanism 405, which may comprise one or more buses, switches, networks and/or any other suitable interconnection. The input devices 402 receive input from a user or machine (e.g., a human operator), and the output devices 401 display or transmit information to a user or machine (e.g., a liquid crystal display). The processor 403 typically executes a computer program called an operating system (e.g., a Microsoft Windows-family operating system or other suitable operating system) which controls the execution of other computer programs, and provides scheduling, input/output and other device control, accounting, compilation, storage assignment, data management, memory management, communication and dataflow control. Collectively, the processor and operating system define the computer platform for which application programs and other computer program languages are written.

The processor 403 may also execute one or more computer programs to implement various functions. These computer programs may be written in any type of computer program language, including a procedural programming language, object-oriented programming language, macro language, or combination thereof. These computer programs may be stored in storage system 406. Storage system 406 may hold information on a volatile or non-volatile medium, and may be fixed or removable. Storage system 406 is shown in greater detail in FIG. 5.

Figure 4:
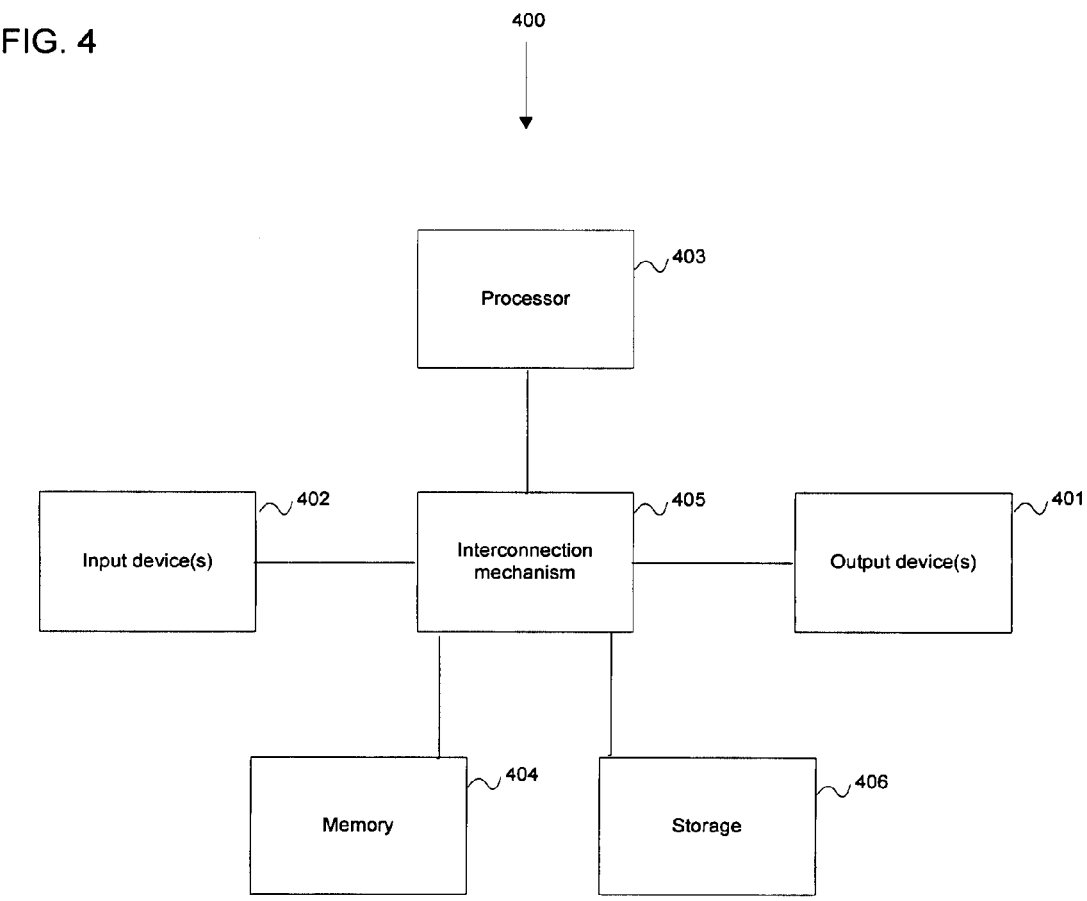
FIG. 4 is a block diagram depicting an exemplary computer with which aspects of the invention may be implemented.
Figure 5:
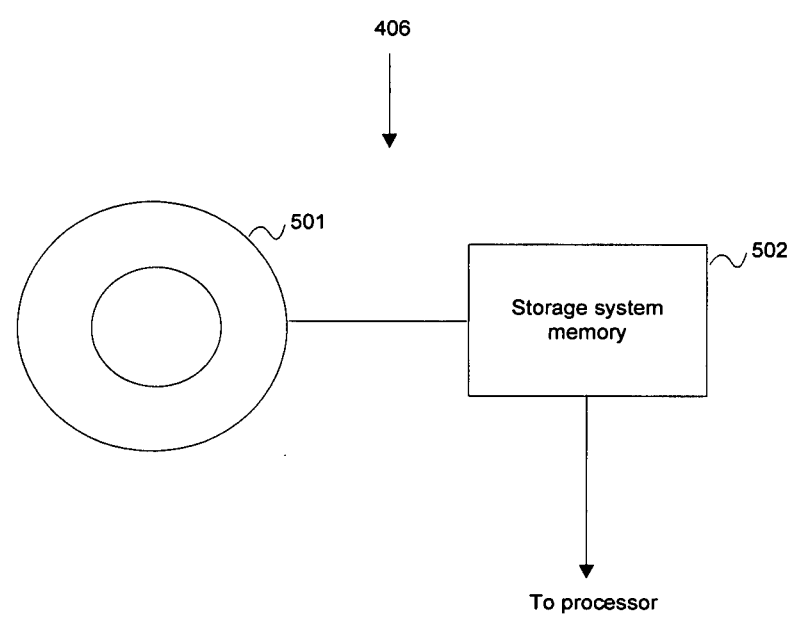
FIG. 5 is a block diagram depicting an exemplary computer memory on which programmed instructions comprising embodiments of the invention may be stored.

Storage system 406 typically includes a computer-readable and writable nonvolatile recording medium 501, on which signals are stored that define a computer program or information to be used by the program. A medium may, for example, be a disk or flash memory. Typically, an operation, the processor 403 causes data to be read from the nonvolatile recording medium 501 into a volatile memory 502 (e.g., a random access memory, or RAM) that allows for faster access to the information by the processor 403 then does the medium 501. The memory 502 may be located in the storage system 406, as shown in FIG. 5, or in memory system 404, as shown in FIG. 4. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited thereto. The invention is also not limited to a particular memory system 404 or storage system 406.

Having thus described several aspects of at least one embodiment of this invention, it is to be appreciated that various alterations, modifications, and improvements will readily occur to those skilled in the art. Such alterations, modifications and improvements are intended to be part of this disclosure, and are intended to be within the spirit and scope of the invention. Accordingly, the forgoing description and drawings are by way of example only.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks. Also, the various methods or processes outlined herein may be coded as software that is executable on one or more processors that employ any one of a variety of operating systems or platforms.

Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy disks, compact disks, optical disks, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be provided in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A method comprising:
    initiating, by a client, a web application including client-side components executing on the client that communicate with server-side components of the web application executing on a server;
    receiving, by the client from the server over at least one network coupling the client and the server, a plurality of objects including data for a document, wherein each object of the plurality of objects received by the client corresponds to an object retained by the server;
    adding, by the client to each object of the plurality of objects, information causing a change log to add an entry when the data included in each object of the plurality of objects is changed;
    storing, by the client, each object of the plurality of objects in a cache;
    executing, by the client, one or more of the client-side components of the web application in response to one or more changes to the document, the executing of the one or more of the client-side components of the web application resulting in a plurality of processing events occurring on the client;
    capturing, by the client, processing events of the plurality of processing events which cause communication with the server for batching client-server communication during the executing of the one or more of the client-side components of the web application;
    recording, by the client, a plurality of entries in the change log, wherein each entry of the plurality of entries specifies:
        at least one of the plurality of processing events occurring on the client,
        at least one object of the plurality of objects stored in the cache, and
        one or more values for the data in the at least one object of the plurality of objects changed by the executing of the one or more of the client-side components of the web application;
    transmitting, by the client, the plurality of entries in the change log to the server in batch via the at least one network upon an occurrence of at least one predetermined event for asynchronous updating of the objects retained by the server; and
    throttling, by the client, frequency of the client-server communication based on at least one of a processing load on the server-side components of the web application executing on the server and a latency of the at least one network.

2. The method of claim 1, wherein the at least one predetermined event comprises an occurrence of a predetermined sequence of the plurality of processing events since a previous transmission of the change log entries from the client to the server.

3. The method of claim 1, wherein the plurality of entries in the change log reflects an order in which the plurality of processing events occurred on the client.

4. The method of claim 1, wherein the at least one predetermined event comprises a predetermined amount of time passing since a previous transmission of the change log entries from the client to the server.

5. The method of claim 1, wherein the at least one predetermined event comprises an occurrence of a predetermined quantity of the plurality of processing events since a previous transmission of the change log entries from the client to the server.

6. The method of claim 1, further comprising at least one of:
    deleting, by the client, one or more entries of the plurality of entries from the change log; and
    merging, by the client, the plurality of entries in the change log.

7. The method of claim 1, further comprising:
    modifying, by the client, the at least one predetermined event.

8. The method of claim 1, further comprising:
    binding, by the client, at least one object of the plurality of objects to a portion of at least one of the one or more of the client-side components of the web application.

9. A client computer comprising:
    at least one processor configured to execute computer-executable instructions; and
    memory storing the computer-executable instructions, the computer-executable instructions for:
        initiating a web application including client-side components executing on the client computer that communicate with server-side components of the web application executing on a server;
        receiving, from the server over at least one network coupling the client computer and the server, a plurality of objects including data for a document, wherein each object of the plurality of objects received by the client computer corresponds to an object retained by the server;

adding, to each object of the plurality of objects, information causing a change log to add an entry when the data included in each object of the plurality of objects is changed;
storing each object of the plurality of objects in a cache;
executing one or more of the client-side components of the web application in response to one or more changes to the document, the executing of the one or more of the client-side components resulting in a plurality of processing event occurring on the client computer;
capturing processing events of the plurality of processing events which cause communication with the server for batching client-server communication during the executing of the one or more of the client-side components of the web application;
recording a plurality of entries in the change log, wherein each of the plurality of entries specifies:
at least one of the plurality of processing events occurring on the client computer,
at least one object of the plurality of objects stored in the cache, and
one or more values for the data in the at least one object of the plurality of objects changed by executing of the one or more of the client-side components of the web application; and
transmitting the plurality of entries in the change log to the server in batch via the at least one network upon an occurrence of at least one predetermined event for asynchronous updating of the objects retained by the server; and
throttling frequency of the client-server communication based on at least one of a processing load on the server-side components of the web application executing on the server and a latency of the at least one network.

10. The client computer of claim 9, wherein the memory further stores computer-executable instructions for:
modifying the at least one predetermined event.

11. The client computer of claim 10, wherein:
the at least one predetermined event comprises a predetermined amount of time passing since a previous transmission of the change log entries to the server; and
modifying the at least one predetermined event comprises increasing the predetermined amount of time so as to decrease a frequency at which the change log entries are transmitted from the client computer to the server.

12. The client computer of claim 9, wherein the memory further stores computer-executable instructions for:
binding at least one object of the plurality of objects to a portion of at least one of the one or more of the client-side components of the web application.

13. The client computer of claim 9, wherein the plurality of entries in the change log reflects an order in which the plurality of processing events occurred on the client computer.

14. The client computer of claim 9, wherein the computer-executable instructions further comprise computer-executable instructions for deleting and merging the change log entries.

15. At least one computer-readable memory device encoded with computer executable instructions which, when executed by a client computer, perform a method comprising acts of:
initiating a web application including client-side components executing on the client computer that communicate with server-side web components of the web application executing on a server;
receiving, from the server over at least one network coupling the client computer and the server, a plurality of objects including data for a document, wherein each object of the plurality of objects received by the client computer corresponds to an object retained by the server;
adding, to each object of the plurality of objects, information causing a change log to add an entry when the data included in each object of the plurality of objects is changed;
storing each object of the plurality of objects in a cache;
executing one or more of the client-side components of the web application in response to one or more changes to the document, the executing of the one or more of the client-side components of the web application resulting in a plurality of processing events occurring on the client computer;
capturing processing events of the plurality of processing events which cause communication with the server for batching client-server communication during the executing of the one or more of the client-side components of the web application;
recording a plurality of entries in the change log, wherein each of the plurality of entries specifies:
at least one of the plurality of processing events occurring on the client computer,
at least one object of the plurality of objects stored in the cache, and
one or more values for the data in the at least one object of the plurality of objects changed by the executing of the one or more of the client-side components of the web application;
transmitting the plurality of entries in the change log to the server in batch via the at least one network upon an occurrence of at least one predetermined event for asynchronous updating of the objects retained by the server; and
throttling frequency of the client-server communication based on at least one of a processing load on the server-side components of the web application executing on the server and a latency of the at least one network.

16. The at least one computer-readable memory device of claim 15, wherein the at least one predetermined event comprises at least one of:
a predetermined amount of time passing since a previous transmission of the change log entries from the client computer to the server,
an occurrence of a predetermined quantity of the plurality of processing events since the previous transmission of the change log entries from the client computer to the server, and
an occurrence of a predetermined sequence of the plurality of processing events since the previous transmission of the change log entries from the client computer to the server.

17. The at least one computer-readable memory device of claim 15, further encoded with computer-executable instructions for:
modifying the at least one predetermined event.

18. The at least one computer-readable memory device of claim 15, wherein the plurality of entries in the change log reflects an order in which the plurality of processing events occurred on the client computer.

19. The at least one computer-readable memory device of claim 15, further encoded with computer-executable instructions for deleting and merging the change log entries.

20. The at least one computer-readable memory device of claim 15, further encoded with computer-executable instructions for binding at least one object of the plurality of objects to a portion of at least one of the one or more of the client-side components of the web application.

* * * * *